Oct. 22, 1963    R. L. PLACEK    3,107,748
CERAMIC COATED MUFFLER AND METHOD OF MAKING IT
Filed Jan. 3, 1961
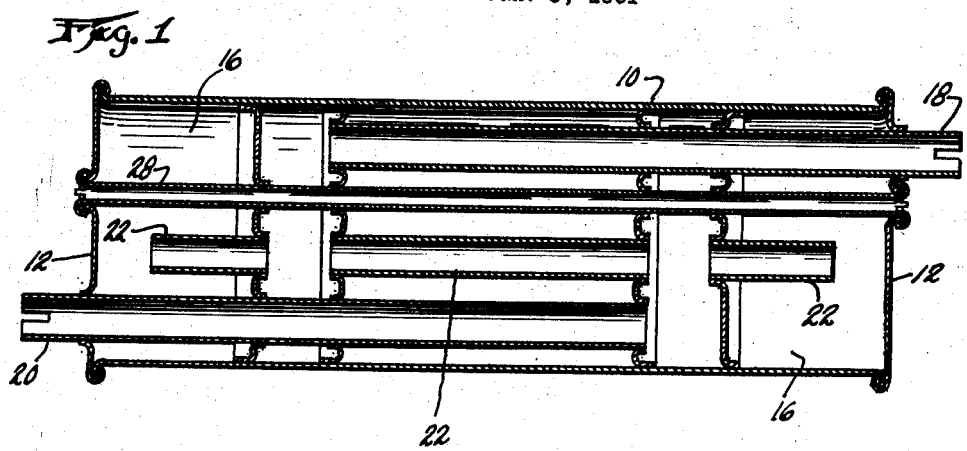
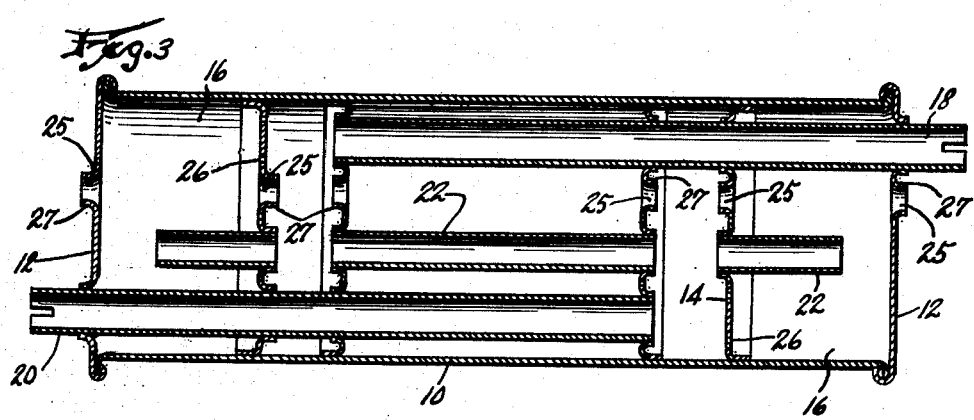
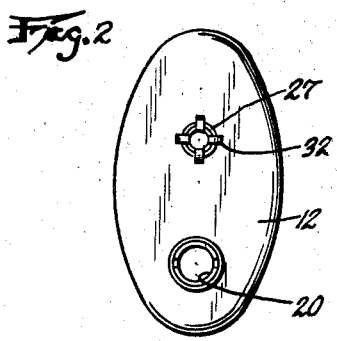
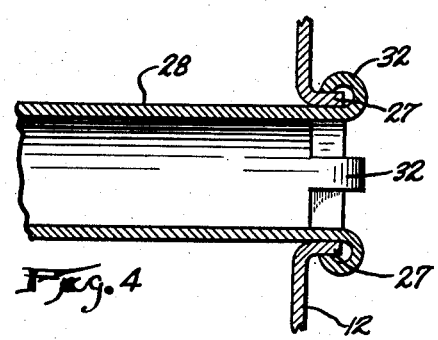
INVENTORS
RAYMOND L. PLACEK,
THOMAS A. DANNER AND
BY    JAMES C. ARTHUR
ATTORNEYS.

United States Patent Office 3,107,748
Patented Oct. 22, 1963

3,107,748
CERAMIC COATED MUFFLER AND METHOD
OF MAKING IT
Raymond L. Placek, Thomas A. Danner, and James C.
Arthur, Columbus, Ind., assignors to Arvin Industries,
Inc., Columbus, Ind., a corporation of Indiana
Filed Jan. 3, 1961, Ser. No. 80,209
5 Claims. (Cl. 181—61)

This invention relates to a ceramic coated muffler construction and to a method of making it.

As is well known in the muffler industry, it is desirable to treat or coat mufflers with a protective material to increase their resistance to corrosion and thus give them an extended life. One of the more common ways of extending the life of a muffler is the application of a coating of procelain or other ceramic material to the internal and external surfaces of the muffler, such as is disclosed in Kuhn Patent No. 2,395,005 and Bryant Patent No. 2,825,421.

The methods heretofore employed in the muffler industry for applying such ceramic coatings to mufflers, however, have had certain deficiencies. Certain of the methods require individually coating the individual components of a muffler prior to their assembly which thus necessitates numerous handling and transfer operations making such process relatively expensive. Other methods employed require the muffler to be either partially or completely assembled and for certain of the assembled components to have relatively small openings formed therein so that the coating material can flow through the muffler to reach the surfaces thereof. Because of the size of the openings involved, this coating operation requires a relatively long time cycle in order for the coating material to flow through the muffler, and even then the coating material fails to reach some of the muffler interstices.

It is thus a general object of our invention to provide a muffler construction and a method of coating it which will overcome the difficulties and disadvantages discussed above. More specifically, it is an object of our invention to provide a ceramic coated muffler which will have a uniform coating over its entire surface, and which will have the desired acoustical properties. It is a further object of our invention to provide a method of applying a ceramic coating to a muffler which can be quickly and easily carried out on a production line basis, which will ensure the formation of a uniform coating of ceramic material over said muffler, and which will provide such coating without adversely affecting the acoustical properties of the muffler.

Our invention is adapted to apply a ceramic coating to a muffler of the general type comprising an elongated outer shell closed at its opposed ends by end plates supporting exhaust inlet and outlet conduits. A plurality of acoustic sound-attenuating chambers are formed within the shell by baffle plates separating said chambers and supporting a plurality of gas conduits operatively interconnecting said chambers.

According to our invention, we coat such a muffler by first forming a plurality of relatively large openings in the muffler baffle and end plates in positions such that said openings will be disposed in alignment with each other when the muffler is assembled. The assembled muffler is subjected to a series of cleaning operations, after which it may be coated with a thin film of nickel. The muffler is then dipped in a slurry of a ceramic material which flows through and around it to dispose a thin coating of the ceramic material on all of the internal and external muffler surfaces. The muffler is then subjected to drying and baking operations to bake on the ceramic coating. After the ceramic coating has been baked, a tube is inserted through the plurality of aligned openings in the baffle and end plates and is rigidly fixed in place. The tube closes the openings to thus prevent said openings from adversely affecting the sound attenuating properties of the acoustic chambers formed by the baffle plates.

Other objects and features of our invention will become apparent from the more detailed description which follows and from the accompanying drawing, in which:

FIG. 1 is a longitudinal section of a muffler embodying our invention;

FIG. 2 is an end elevation of the muffler shown in FIG. 1;

FIG. 3 is a longitudinal section of the muffler shown in FIG. 1, but with its axially extending tube removed therefrom; and FIG. 4 is an enlarged fragmentary vertical section showing the interconnection between the axially extending tube and one of the end plates.

As shown in the drawing, our ceramic coated muffler comprises an elongated outer shell 10 having its ends enclosed by end plates 12. A plurality of baffle plates 14 are rigidly secured to the inner faces of the shell 10 and define a plurality of acoustic chambers 16 for attenuating the noise level of the exhaust gases passing through the muffler. The end plates 12 support inlet and outlet gas conduits 18 and 20, and the baffle plates 14 support gas conduits 22 which dispose the several chambers 16 in operative comunication with each other.

Our novel muffler construction differs from conventional muffler constructions in that prior to assembly we form a plurality of openings 25 in the end and baffle plates, said openings being relatively large having diameters of about one inch. The openings 25 are oriented on the end and baffle plates so that when the muffler is assembled said openings are disposed in alignment with each other throughout the length of the muffler. Conveniently, as shown in FIG. 2, the openings 25 are formed and defined by axially extending nipples 27 formed in end and baffle plates 12 and 14. A second series of openings 26 are indiscriminately formed in the baffle plates 14 and are substantially smaller than the openings 25, having diameters ranging up to a maximum of about one-eighth inch.

The muffler construction just described is assembled as shown in FIG. 3 and is then subjected to a sequence of conventional preparatory and ceramic coating operations. Such a sequence first begins with cleaning the muffler by soaking it in a boiling alkaline solution for several minutes, after which it is subjected to one or more water rinses to remove any residual alkali therefrom. A second cleaning step follows in which the muffler is soaked for several minutes in an acid bath maintained in an elevated temperature, after which the muffler is again subjected to one or more water rinses. After the acid treatment, the muffler is soaked in a neutralizing solution, such as for example an aqueous solution of soda ash and borax maintained at an elevated temperature, to ensure against the possibility of any acid or alkali remaining in the muffler.

In order to increase the adhesiveness of the ceramic coating to be subsequently applied, the muffler is nickel flashed, as by soaking it in a bath of an aqueous solution of nickel sulphate maintained at an elevated temperature. This creates a thin depository nickel coating on the muffler to provide a better surface for adherence of the ceramic coating onto the muffler.

After the nickel coating has been applied, the muffler is thoroughly dried and is then ready for the application of a ceramic coating to its surfaces. The ceramic coating is applied by dipping the muffler into a slurry of the desired ceramic material. Desirably, such slurry may comprise a suspension of finely ground frit in water having a consistency of heavy paint. The slurry flows through and around the muffler to thus coat all of its surfaces, and the excess slurry is then allowed to drain from the muffler leaving a thin coating of the ceramic material disposed over all of the internal and external surfaces of the muffler. With the muffler thus coated, hot dried air is forced through and over it to remove the excess moisture from the deposited coating, and the coated muffler is then baked in an oven maintained at about 1500° F. to fuse the ceramic coating. These operational steps of cleaning, nickel flashing, and coating are all conventional well known practices employed in the coating industry, and thus the precise materials and method techniques employed in any one or all of these steps may be adjusted as desired.

During all of these processing steps, the liquid materials employed rapidly flow through the relatively large openings 25 in the muffler so that said liquid material can reach all of the interstices of the muffler. The openings 26 form vent openings to prevent the formation of air blocks which would impede the flow of liquid through the muffler. The openings 25 and 26 not only provide means for ensuring that the liquids reach all of the interstices of the muffler, but in addition, the openings 25 provide a rapid fluid-flow passage through the muffler, and an escape passage for the water vapors which are produced during the drying and baking operations.

The slurry of the ceramic material comprises a viscous suspension of solid particles in a water carrier, and it is thus essential that after the muffler has been dipped in such a slurry that the slurry be rapidly drained from said muffler in order that the suspended ceramic particles do not settle out of the suspension and thereby create a nonuniform coating. The openings 25, however, being relatively large, permit the slurry to be quickly drained from the muffler before the suspended ceramic particles can settle out, thus ensuring a uniform thickness of the ceramic coating on the muffler.

After the muffler has been coated in the manner just described, the openings 25 are closed by an elongated tube 28, which has been previously ceramic coated. As shown in FIG. 2, the tube 28 has an outer diameter corresponding to the diameters of the openings 25 and nipples 27 so that when said tube is inserted in the muffler it completely closes all of the openings 25 in the baffle plates 14 and end plates 12, with said nipples 27 providing spaced axially extending supports for said tube. With both the nipples 27 and tube 28 being coated, the joints formed at their interconnections will thus be provided with a protective coating reducing their susceptibility to corrosion. Conveniently, in order to fixedly mount the tube 28 in the muffler, the outwardly projecting end plate nipples 27 support the ends of the tube 28, and said tube ends are provided with a plurality of circumferentially spaced tongues 32 crimped over said nipples.

Thus, the openings 25 remain open during the coating sequence to provide a fluid-flow passage for the liquids moving through the muffler to ensure that all of the interior surfaces of said muffler are reached by said liquids; to ensure a rapid movement of said liquids through the muffler; and to ensure a uniform ceramic coating on all of the interior surfaces of the muffler. However, after said coating sequence, the openings 25 are closed by the tube 28 so that said openings do not interfere with or decrease the silencing of the exhaust gases by the acoustic chambers 16, and in addition, prevent excessive gas leakage through the end plates. Some or all of the small diameter vent openings 26 may be closed by coating material, but because of their small diameters, these openings 26 which are not closed will not adversely affect the operation or efficiency of the acoustic chambers 16.

For convenience of description, we have described our invention in terms of the application of a ceramic coating. It is to be understood, however, that the term ceramic is used generically and includes porcelain enamels, glass, frit, and the like.

We claim as our invention:

1. A ceramic coated muffler, comprising a unitary elongated continuous outer shell, a pair of end plates closing the opposed ends of said shell and supporting exhaust inlet and outlet conduits, a plurality of baffle plates mounted within the shell and dividing the shell interior into a plurality of acoustic chambers, a plurality of elongated conduits mounted on said baffle plates and operatively interconnecting said plurality of acoustic chambers, means extending the length of said muffler through a plurality of aligned openings formed in said baffle and end plates and closing the same, and a ceramic coating on the surfaces of said muffler and its components.

2. A ceramic coated muffler, comprising a unitary elongated continuous outer shell, a pair of end plates closing the opposed ends of said shell and supporting exhaust inlet and outlet conduits, a plurality of baffle plates mounted within the shell and dividing the shell interior into a plurality of acoustic chambers, a plurality of elongated conduits mounted on said baffle plates and operatively interconnecting said plurality of acoustic chambers, an elongated tube extending the length of the muffler through a plurality of aligned openings formed in said baffle and end plates and closing the same, the openings in said end plates being defined by nipples projecting out of the general planes of said end plates with the ends of said tube being rigidly mounted therein, and a ceramic coating on the surfaces of said muffler and its components.

3. A ceramic coated muffler, comprising a unitary elongated continuous outer shell, a pair of end plates closing the opposed ends of said shell and supporting exhaust inlet and outlet conduits, a plurality of baffle plates mounted within the shell and dividing the shell interior into a plurality of acoustic chambers, a plurality of elongated conduits mounted on said baffle plates and operatively interconnecting said plurality of acoustic chambers, a plurality of annular nipples projecting outwardly from said end and baffle plates and defining the circumferential edges of a plurality of aligned openings, a ceramic coating covering the surfaces of said muffler, and an elongated ceramic coated tube extending the length of said muffler and supported in said nipples to close said plurality of aligned openings.

4. A method of making a ceramic coated muffler having a unitary outer shell enclosed by end plates supporting exhaust inlet and outlet conduits and housing a plurality of acoustic chambers interconnected by a plurality of conduits and separated from each other by baffle plates, comprising the steps of forming a plurality of openings in said baffle and end plates whereby upon muffler assembly said openings will be disposed in alignment, assembling said muffler, removing the contaminants from the surfaces of said muffler, dipping said muffler in a slurry of ceramic material and coating the interior and exterior exposed muffler surfaces with said slurry, heat treating said muffler to dry said slurry and bake the ceramic material therein, said openings providing continuous fluid-flow passages through said muffler during said contaminant-removing, dipping, and heat-treating steps, and inserting a ceramic coated tube through said aligned openings to close the same, said tube being rigidly connected to said end plates.

5. A method of making a ceramic coated muffler having a unitary outer shell enclosed by end plates supporting exhaust inlet and outlet conduits and housing a plurality of acoustic chambers interconnected by a plurality of conduits and separated from each other by baffle plates, comprising the steps of forming a first set of small diameter openings in said baffle plates and a second set of relatively large diameter openings in said end and baffle plates whereby upon muffler assembly said second set of openings will be disposed in alignment; assembling said muffler, removing the contaminants from the surfaces of said muffler, dipping said muffler in a slurry of ceramic material and coating the interior and exterior exposed muffler surfaces with said slurry, heat treating said muffler to dry said slurry and bake the ceramic material thereon, said second set of openings providing continuous fluid-flow passages through said muffler during said contaminant-removing, dipping and heat-treating steps and said first set of openings providing vent openings for said fluid-flow, and inserting a ceramic coated tube through said second set of openings to close the same, said tube being rigidly connected to said end plates.

References Cited in the file of this patent

UNITED STATES PATENTS

| | | |
|---|---|---|
| 2,194,550 | Hector et al. | Mar. 26, 1940 |
| 2,391,468 | Long | Dec. 25, 1945 |
| 2,395,005 | Kuhn | Feb. 19, 1946 |
| 2,772,187 | Katz | Nov. 27, 1956 |
| 2,922,485 | Muller | Jan. 26, 1960 |

FOREIGN PATENTS

| | | |
|---|---|---|
| 126,776 | Australia | Feb. 10, 1948 |